(12) United States Patent
Murayama et al.

(10) Patent No.: US 8,419,296 B2
(45) Date of Patent: Apr. 16, 2013

(54) OPTICAL FIBER STRUCTURE, SYSTEM FOR FABRICATING THE SAME, AND BLOCK-LIKE CHIP FOR USE THEREIN

(75) Inventors: Manabu Murayama, Amagasaki (JP); Motohiko Yamasaki, Amagasaki (JP); Takeshi Satake, Amagasaki (JP); Masahiro Miura, Amagasaki (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 352 days.

(21) Appl. No.: 12/679,101

(22) PCT Filed: Sep. 19, 2007

(86) PCT No.: PCT/JP2007/068141
§ 371 (c)(1),
(2), (4) Date: Mar. 19, 2010

(87) PCT Pub. No.: WO2009/037744
PCT Pub. Date: Mar. 26, 2009

(65) Prior Publication Data
US 2010/0310210 A1    Dec. 9, 2010

(51) Int. Cl.
*G02B 6/255* (2006.01)
*G02B 6/26* (2006.01)
*G02B 6/00* (2006.01)

(52) U.S. Cl.
USPC ............... 385/98; 385/43; 385/52; 385/95; 385/136; 385/137; 65/407; 65/501

(58) Field of Classification Search ............... 385/33, 385/43, 47, 49, 52, 53, 55, 95–98, 136–137; 65/384, 387, 407, 501; 29/721
See application file for complete search history.

(56) References Cited

U.S. PATENT DOCUMENTS

| | | | | |
|---|---|---|---|---|
| 4,984,885 | A * | 1/1991 | Ortiz, Jr. | 356/153 |
| 5,619,602 | A | 4/1997 | Sandstrom et al. | 385/31 |
| 5,729,643 | A * | 3/1998 | Hmelar et al. | 385/43 |
| 6,324,326 | B1 * | 11/2001 | Dejneka et al. | 385/123 |
| 6,424,765 | B1 * | 7/2002 | Harker | 385/31 |
| 2002/0064341 | A1 * | 5/2002 | Fauver et al. | 385/25 |
| 2002/0080842 | A1 * | 6/2002 | An et al. | 372/92 |
| 2002/0197027 | A1 * | 12/2002 | Saito et al. | 385/96 |
| 2003/0043472 | A1 * | 3/2003 | Mandella | 359/641 |

FOREIGN PATENT DOCUMENTS

| | | |
|---|---|---|
| CN | 101013182 | 8/2007 |
| JP | 61-188509 | 8/1986 |
| JP | 62-86306 | 4/1987 |
| JP | 63-163427 | 10/1988 |

(Continued)

OTHER PUBLICATIONS

Inernational Search Report from PCT/JP2007/068141 dated Oct. 31, 2007.
English translation of Office Action dated Jul. 28, 2009 from corresponding JP 2006-104121.

*Primary Examiner* — Uyen Chau N Le
*Assistant Examiner* — Michael Mooney
(74) *Attorney, Agent, or Firm* — Ohlandt, Greeley, Ruggiero & Perle, L.L.P.

(57) ABSTRACT

An optical fiber structure (10) includes an optical fiber (11a), and a block-like chip (12) joined to the optical fiber (11a). The block-like chip (12) is tapered toward its fiber-joined end.

10 Claims, 3 Drawing Sheets

FOREIGN PATENT DOCUMENTS

| | | |
|---|---|---|
| JP | 63-307785 | 12/1988 |
| JP | 6-313817 | 11/1994 |
| JP | 11-344648 | 12/1999 |
| JP | 2000-171608 | 6/2000 |
| JP | 2001-208924 | 8/2001 |
| JP | 2004-55971 | 2/2004 |
| JP | 2004-157403 | 6/2004 |
| JP | 2005-234441 | 9/2005 |
| JP | 2006-330485 | 12/2006 |
| JP | 2007-65437 | 3/2007 |

* cited by examiner

OPTICAL FIBER STRUCTURE, SYSTEM FOR FABRICATING THE SAME, AND BLOCK-LIKE CHIP FOR USE THEREIN

TECHNICAL FIELD

The present invention relates to optical fiber structures, systems for fabricating the same, and block-like chips for use therein.

BACKGROUND ART

Laser guides have been widely used, as optical fiber components for transmitting laser beams with high energy density, for machining equipment, etc.

PATENT DOCUMENT 1 describes such a laser guide configured so that an optical fiber for a laser guide is coaxially joined at least one end with a cylindrical block-like chip (rod) having a greater diameter than the optical fiber.

However, for the laser guide described in PATENT DOCUMENT 1, the area of an end face of the optical fiber is significantly different from that of an end face of the block-like chip, and thus the optical fiber and the block-like chip have drastically different heat capacities. This makes it difficult to fuse the optical fiber and the block-like chip together using electric discharge, a burner, etc. Therefore, the laser guide has poor workability, resulting in low productivity.

PATENT DOCUMENT 1: U.S. Pat. No. 5,619,602

SUMMARY OF THE INVENTION

An optical fiber structure of the present invention includes: an optical fiber; and a block-like chip joined to the optical fiber. The block-like chip is tapered toward a fiber-joined end of the block-like chip.

A system for fabricating an optical fiber structure of the present invention is directed to a system for fabricating an optical fiber structure configured so that a block-like chip is joined to an optical fiber. The system includes: a chip retainer for retaining the block-like chip; a fiber retainer for retaining the optical fiber; a moving member for relatively moving the chip retainer and the fiber retainer so that the block-like chip retained by the chip retainer and the optical fiber retained by the fiber retainer are in coaxial contact with each other; a heater for heating the block-like chip retained by the chip retainer and the optical fiber retained by the fiber retainer; and an axial relationship observer for observing, from an end of the block-like chip opposite to a fiber joined end of the block-like chip retained by the chip retainer, an axial relationship between the fiber-joined end of the block-like chip and an end of the optical fiber.

A block-like chip of the present invention is used while being joined to an optical fiber, and is tapered toward a fiber-joined end of the block-like chip.

BRIEF DESCRIPTION OF THE DRAWINGS

FIG. 1A is a side view illustrating an optical fiber structure; FIG. 1B is a perspective cross-sectional view illustration the layers of an optical fiber structure.

FIG. 2A is a side view illustrating a block-like chip, and FIG. 2B is a side view illustrating a block-like with sandblasted outer surface.

FIG. 3 is a diagram illustrating the configuration of a system for fabricating an optical fiber structure.

DESCRIPTION OF EMBODIMENTS

An embodiment will be described hereinafter in detail with reference to the drawings.

Figure 1A:
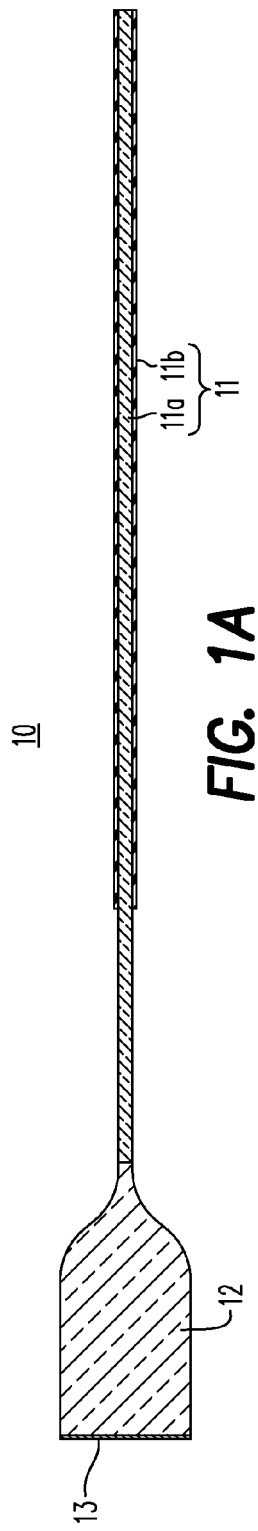
[FIGS. 1A and 1B]
Figure 1B:
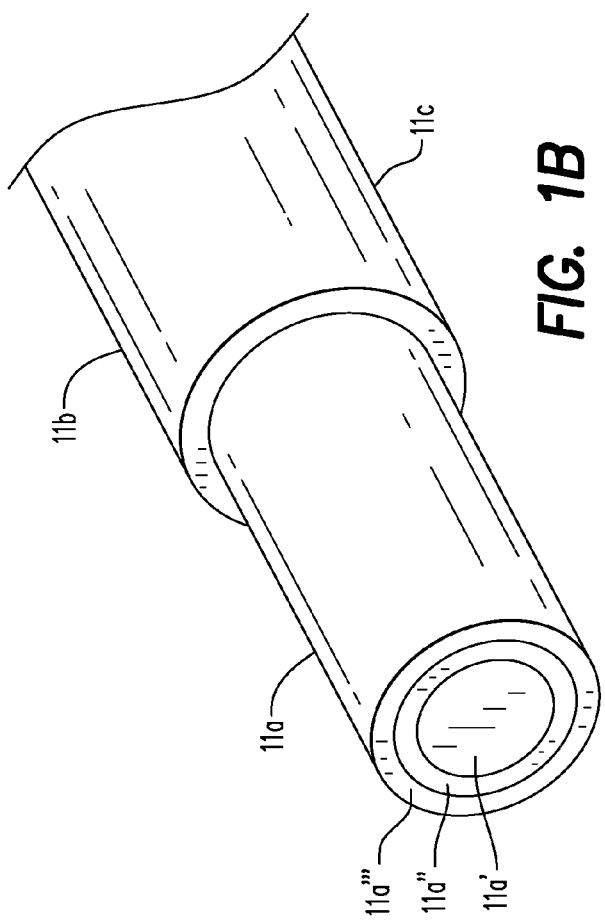

FIG. 1 illustrates an optical fiber structure 10 according to this embodiment. This optical fiber structure 10 is used while being incorporated into a laser guide for machining equipment, etc.

This optical fiber structure 10 includes an optical fiber 11$a$, and a block-like chip 12 joined to at least one end of the optical fiber 11$a$.

The optical fiber 11$a$ includes a high refractive index core 11$a'$ forming the core of the optical fiber 11$a$ and made of pure quartz, and a low refractive index clad 11$a''$ formed integrally with the core to cover the core and made of quartz doped with fluorine, etc. The optical fiber 11$a$ may include a support layer 11$a'''$ formed integrally with the clad 11$a''$ to cover the clad and made of pure quartz. The optical fiber 11$a$ has, for example, a length of 5 mm-300 m, an outer diameter of 125-1500 μm, and a core diameter of 50-1200 μm. When the optical fiber 11$a$ includes a support layer 11$a'''$, the clad 11$a''$ has, for example, a thickness of 3-90 μm, and the support layer 11$a'''$ has, for example, a thickness of 5-60 μm. For example, the refractive index of the core 11$a'$ of the optical fiber 11$a$ is 1.458, and the refractive index of the clad 11$a''$ thereof is 1.440-1.454. When the optical fiber 11$a$ includes a support layer 11$a'''$, the refractive index of the support layer 11$a'''$ is 1.458. The optical fiber 11$a$ and a coating layer 11$b$ coating the optical fiber 11$a$ and made of a UV curable resin, etc., may form a coated optical fiber 11.

Figure 2A:
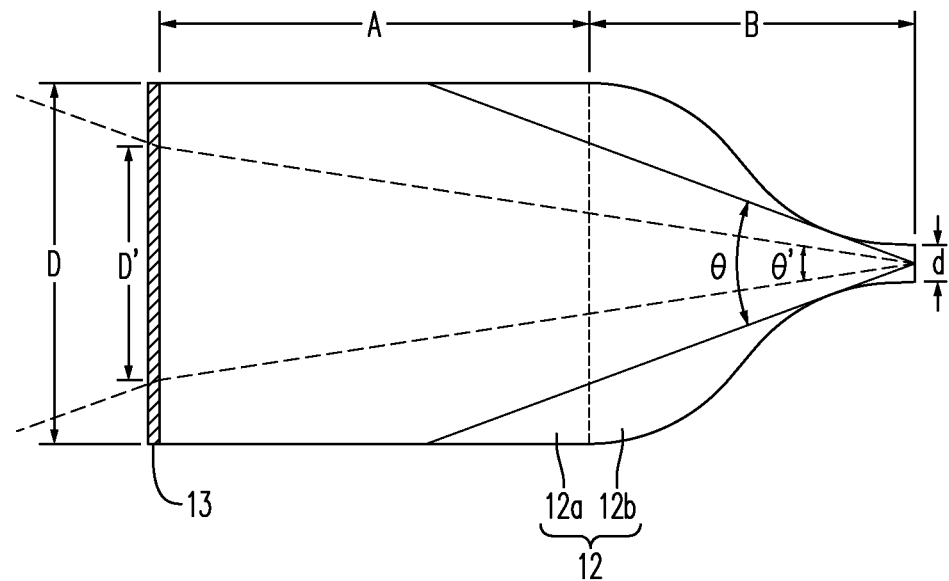
[FIGS. 2A and 2B]
Figure 2B:
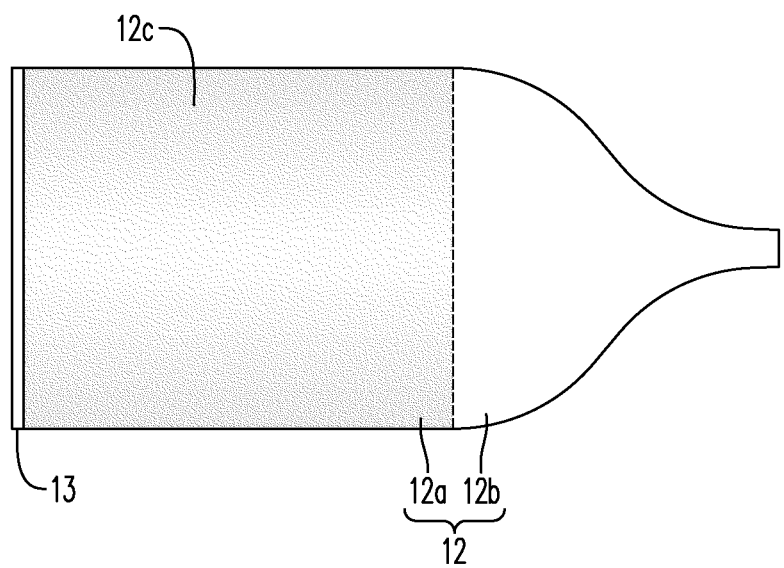

FIG. 2 illustrates a block-like chip 12.

A distal portion 12$a$ of the block-like chip 12 is formed in a cylindrical shape or any other shape. A proximal portion 12$b$ of the block-like chip 12 is formed in a bottleneck shape so as to be tapered toward the corresponding chip end. The end face of the chip 12 corresponding to the proximal portion 12$b$ is formed parallel to the end face of the chip 12 corresponding to the distal portion 12$a$. The end face of the chip 12 corresponding to the proximal portion 12$b$ is joined to an end face of the optical fiber 11$a$ by fusing them together. In other words, the end face of the block-like chip 12 corresponding to the distal portion 12$a$ forms a light entrance or a light exit, and the end of the chip 12 corresponding to the proximal portion 12$b$ forms the fiber-joined chip end to be joined to the optical fiber 11$a$. This configuration allows light beams to enter and exit from the end face of the block-like chip 12 corresponding to the distal portion 12$a$. The chip end face corresponding to the distal portion 12$a$ is wider than the end face of the optical fiber 11$a$. As such, even when the intensity and density of incoming and outgoing light are reduced, the light beams are collected into the optical fiber 11$a$, and thus the optical fiber 11$a$ can transmit high-intensity and high-density light beams. In view of the above, the optical fiber 11$a$ can be prevented from being damaged due to direct entrance and exit of high-intensity and high-density light beams into and from the end face of the optical fiber 11$a$. The tapered shape of the proximal portion 12$b$ of the block-like chip 12 is not limited to a bottleneck shape. The proximal portion 12$b$ may be tapered to provide a cone or any other shape.

As illustrated in FIG. 2, the end face of the block-like chip 12 corresponding to the distal portion 12$a$, i.e., the light entrance end face or light exit end face of the chip 12, may be coated with an AR coating (anti-reflection coating) 13. When the end faces of the optical fiber 11$a$ are coated with AR coatings, the entire coated optical fiber 11 needs to be placed into an evaporator. Alternatively, a special evaporator needs to be used. In the former case, the process efficiency is low, resulting in poor productivity. In the latter case, an evaporator needs to be modified. However, with a configuration as described above, only many block-like chips 12 can be placed into a general-purpose evaporator before fusing with optical fibers 11$a$, thereby depositing AR coatings 13 on the block-like chips 12. The AR coatings 13 include, for example, an $HfO_2$—$SiO_2$ film, a $Ta_2O_5$—$SiO_2$ film, an $Al_2O_3$—$SiO_2$ film, and an $Nb_2O_5$—$SiO_2$ film.

Furthermore, at least the outer circumferential surface of the distal portion 12a of the block-like chip 12 may be roughened by sandblasting 12C, etc. With such a structure, when stray light, etc., has entered the light entrance end face of the chip 12 from outside, the stray light, etc., can be allowed to escape to the outside without being reflected off the light entrance end face.

The block-like chip 12 has, for example, a length of 5-30 mm. The outer diameter D of the end face of the block-like chip 12 corresponding to the distal portion 12a is, for example, 1-25 mm, and the outer diameter d of the end face of the block-like chip 12 corresponding to the proximal portion 12b is, for example, 0.2-3 mm. When, as illustrated in FIG. 2, the length of the distal portion 12a of the block-like chip 12 is denoted by the character "A", the length of the tapered proximal portion 12b thereof is denoted by the character "B", and the spread angle of the proximal portion 12b is denoted by the symbol "θ", they are preferably set to satisfy the following conditions: the divergence angle θ' of light from the optical fiber 11a is equal to or less than the spread angle θ; and the beam diameter D' of the light at the end face of the block-like chip 12 corresponding to the distal portion 12a is equal to or less than the outer diameter D. The divergence of a laser beam depends on the numerical aperture (NA) of the optical fiber 11a. In view of the above, the length A is, for example, 1-29 mm, the length B is, for example, 1-29 mm, and the spread angle θ is, for example, 10-25°. In terms of the workability in retention of the block-like chip 12 to be fused with the optical fiber 11a in a V-groove, etc., the length A is preferably equal to or greater than 1 mm.

Such an optical fiber structure 10 itself can be used as an optical element. Furthermore, when an optical fiber structure is configured so that an optical fiber 11a has a relatively short length of 5-100 mm and a block-like chip 12 is joined only to one end of the optical fiber 11a, the optical fiber structure can be used as an optical component. With use of this optical component, the connection between the other end of the optical fiber 11a and one end of another optical fiber 11a can easily provide a new optical fiber structure 10 configured so that the resultant optical fiber is provided at one end with the block-like chip 12.

The optical fiber structure 10 configured as described above can be formed by bringing the fiber-joined end of the block-like chip 12 and an end of the optical fiber 11a in contact with each other while heating them.

For this optical fiber structure 10, the block-like chip 12 is formed so as to be tapered toward the fiber-joined end of the block-like chip 12 as described above. This reduces the difference between the area of an end face of the optical fiber 11a and that of the fiber-joined end face of the block-like chip 12. Therefore, the respective heat capacities of the optical fiber 11a and the block-like chip 12 are close to each other. This can facilitate fusing the end faces together. As a result, high productivity can be achieved.

Here, since the heat capacity of the fiber-joined end of the block-like chip 12 is preferably close to that of an end of the optical fiber 11a, the outer diameter of the fiber-joined end face of the block-like chip 12 is preferably 1-5 times greater than that of the end face of the optical fiber 11a.

Furthermore, the optical fiber 11a preferably has a three-layer structure of a core, a clad, and a support layer rather than a two-layer structure of a core and a clad because, with this three-layer structure, deformation of the optical fiber 11a due to heating for joining the optical fiber 11a to the block-like chip 12 has a negligible effect on the core and the clad.

Next, an optical fiber structure fabrication system 20 will be described.

Figure 3:
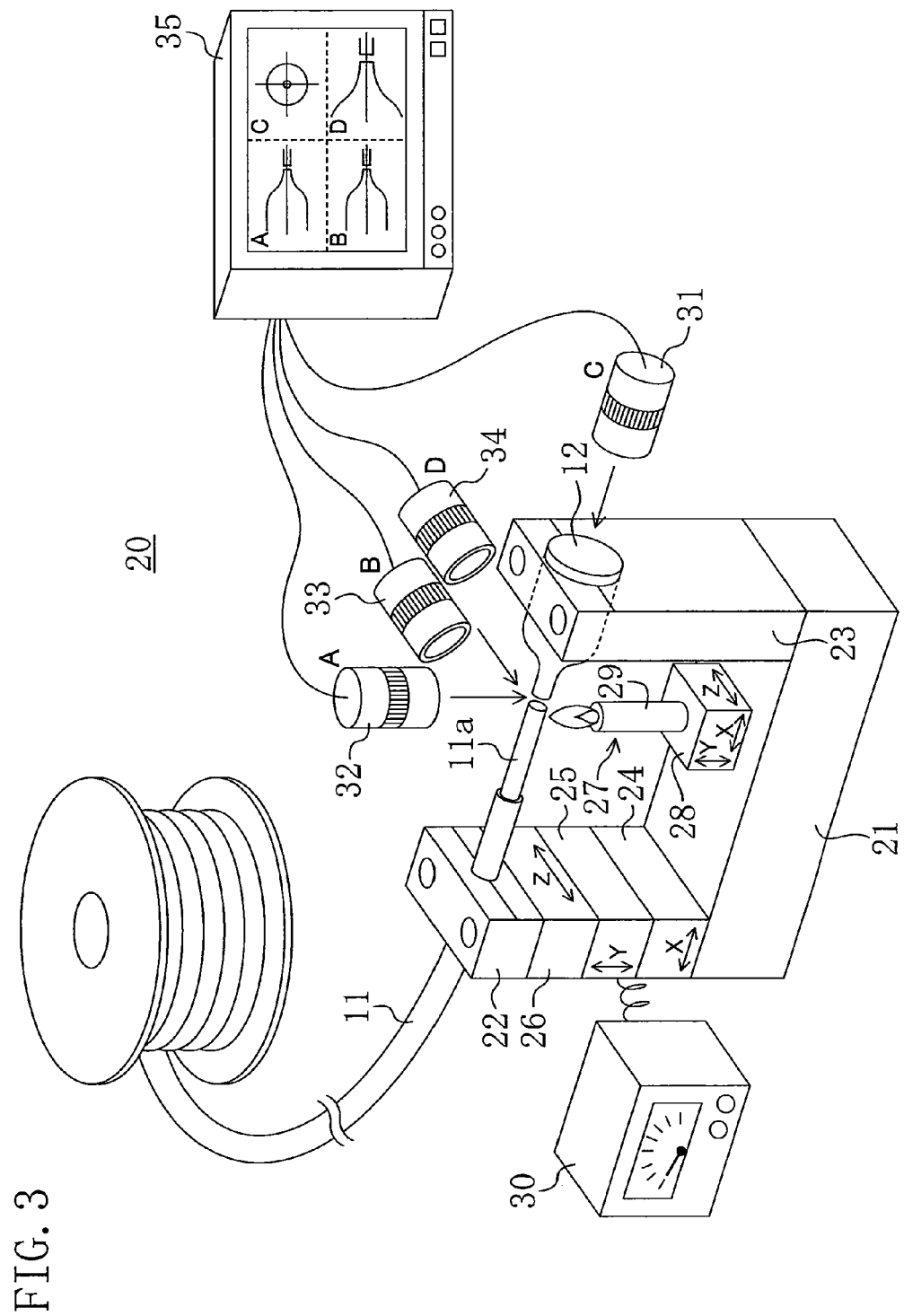
[FIG. 3]

FIG. 3 illustrates the configuration of the optical fiber structure fabrication system 20.

The optical fiber structure fabrication system 20 includes a horizontal rectangular parallelepiped shaped stage body 21. The length directions of this stage body 21 are denoted by X directions, the height directions thereof is denoted by Y directions, and the width directions thereof is denoted by Z directions.

The stage body 21 is provided at one end with a fiber retainer 22 for retaining an optical fiber 11a, and provided at the other end with a chip retainer 23 for retaining a block-like chip 12.

The fiber retainer 22 is provided on a structure obtained by stacking an X-direction movable member 24 movable in the X directions, a Y-direction movable member 25 movable in the Y directions, and a Z-direction movable member 26 movable in the Z directions in bottom-to-top order. The fiber retainer 22 includes a pair of upper and lower members. V-grooves are formed in the lower surface of the upper member and the upper surface of the lower member, respectively. A coated optical fiber 11 drawn from a bobbin is sandwiched between the upper and lower members so as to be retained in these V-grooves.

The chip retainer 23 also includes a pair of upper and lower members. V-grooves are formed in the lower surface of the upper member and the upper surface of the lower member, respectively. A distal portion 12a of the block-like chip 12 is sandwiched between the upper and lower members so as to be retained in these V-grooves.

A heater 27 is provided on a region of the stage body 21 between the fiber retainer 22 and the chip retainer 23.

The heater 27 includes a movable member 28 movable in the X, Y, and Z directions, and a heater body 29 provided on the movable member 28 to produce a flame by gas or arc discharge. The heater 27 is connected to a heating adjuster 30 for adjusting the intensity of the flame.

The optical fiber structure fabrication system 20 includes a Y-direction observation camera 32 disposed above the location where the optical fiber 11a and the block-like chip 12 are joined together, a Z-direction observation camera 33 and a Z-direction magnification observation camera 34 both disposed lateral to the above-described location, and an X-direction observation camera (axial relationship observer) 31 disposed opposite to the fiber-joined end of the block-like chip 12 retained by the chip retainer 23.

The Y-direction observation camera 32, the Z-direction observation camera 33, the Z-direction magnification observation camera 34, and the X-direction observation camera 31 each include a CCD camera. The Y-direction observation camera 32, the Z-direction observation camera 33, and the Z-direction magnification observation camera 34 each observe the axial relationship between the fiber-joined end of the block-like chip 12 and an end of the optical fiber 11a from a direction perpendicular to the axis of the fiber. The X-direction observation camera 31 observes the axial relationship between the fiber joined end of the block-like chip 12 and the chip-joined end of the optical fiber 11a to be joined to the block-like chip 12 from an axial direction of the fiber.

The Y-direction observation camera 32, the Z-direction observation camera 33, the Z-direction magnification observation camera 34, and the X-direction observation camera 31 are each connected to a monitor 35. The monitor 35 has a screen divided into four sections. An image captured by each of these cameras is displayed on the corresponding one of the four sections.

Next, a method for fabricating an optical fiber structure 10 using the optical fiber structure fabrication system 20 will be described.

First, a coated optical fiber 11 is retained by a fiber retainer 22 so that an optical fiber 11a exposed by separating a coating layer 11b from the optical fiber 11a protrudes inwardly. A block-like chip 12 is retained by a chip retainer 23 so that a tapered proximal portion 12b of the block-like chip 12 protrudes inwardly.

Next, the optical fiber 11a retained by the fiber retainer 22 is positioned using an X-direction movable member 24, a Y-direction movable member 25, and a Z-direction movable member 26 so that an end face of the optical fiber 11a is opposed to the fiber joined end face of the block-like chip 12 retained by the chip retainer 23. In view of the above, the X-direction movable member 24, the Y-direction movable member 25, and the Z-direction movable member 26 form moving members. In the above-mentioned positioning, images captured by a Y-direction observation camera 32, a Z-direction observation camera 33, a Z-direction magnification observation camera 34, and a X-direction observation camera 31 are viewed on the screen of a monitor 35, thereby identifying the axial relationship between the fiber-joined end of the block-like chip 12 and the end of the optical fiber 11a.

Next, a heater 27 is positioned between the end of the optical fiber 11a and the fiber-joined end of the block-like chip 12 by a movable member 28.

Next, the end of the optical fiber 11a and the fiber-joined end of the block-like chip 12 are heated by the heater 27. The fiber retainer 22 is moved by the X-direction movable member 24, and the end of the optical fiber 11a is thus brought gradually closer to the fiber-joined end of the block-like chip 12 retained by the chip retainer 23 to provide contact therebetween, thereby fusing the optical fiber 11a and the block-like chip 12 together. In this case, images captured by the Y-direction observation camera 32, the Z-direction observation camera 33, the Z-direction magnification observation camera 34, and the X-direction observation camera 31 are again viewed on the screen of the monitor 35, thereby identifying the axial relationship between the fiber-joined end of the block-like chip 12 and the end of the optical fiber 11a.

Subsequently, the heating of the heater 27 is stopped, and the fiber retainer 22 is moved by the X-direction movable member 24, thereby applying a slight tension to a fused portion of a resultant optical fiber structure 10 where the optical fiber 11a and the block-like chip 12 are fused together.

Thereafter, the fiber retainer 22 and the chip retainer 23 terminate the retention of the optical fiber 11a and the block-like chip 12. Thus, the optical fiber structure 10 is taken out of the retainers 22 and 23.

A fiber splicer for joining optical fibers together can align the optical fibers by identifying the axial relationship between the respective ends of the optical fibers from a direction perpendicular to the axes of the optical fibers, but cannot align the optical fibers by identifying the above-described axial relationship from axial directions of the optical fibers. However, since the optical fiber structure fabrication system 20 is provided with the X-direction observation camera 31, it can align the optical fiber 11a and the block-like chip 12 by identifying the axial relationship between the fiber-joined end of the block-like chip 12 and the end of the optical fiber 11a from respective axial directions of the optical fiber 11a and the block-like chip 12. This enables determination of the quality of the fusion deteriorated by air bubbles in the fused portion of the optical fiber structure 10, and deformation of the end face of the optical fiber 11a. Furthermore, if necessary, air bubbles can be removed from the fused portion by further heating the fused portion. Alternatively, the fused portion can be shrunk.

INDUSTRIAL APPLICABILITY

The present invention is useful for optical fiber structures, systems for fabricating the same, and block-like chips for use therein.

The invention claimed is:

1. A system for fabricating an optical fiber structure configured so that a block-like chip which is tapered toward a fiber-joined end of the block-like chip, and which block-like chip has a length of 5-30 mm is joined to an optical fiber, the system comprising:
   a chip retainer for retaining the block-like chip;
   a fiber retainer for retaining the optical fiber;
   a moving member for relatively moving the chip retainer and the fiber retainer so that the block-like chip retained by the chip retainer and the optical fiber retained by the fiber retainer are in coaxial contact with each other;
   a heater for heating the block-like chip retained by the chip retainer and the optical fiber retained by the fiber retainer; and
   an axial relationship observer for observing, from an end of the block-like chip opposite to a fiber-joined end of the block-like chip retained by the chip retainer, an axial relationship between the fiber-joined end of the block-like chip and an end of the optical fiber.

2. The system for fabricating an optical fiber structure of claim 1, wherein the block-like chip is made of a single material.

3. The system for fabricating an optical fiber structure of claim 1, wherein the block-like chip has a distal portion with an outer circumferential surface thereof and wherein the outer circumferential surface is subjected to sandblasting.

4. The system for fabricating an optical fiber structure of claim 1, wherein the block-like chip has a distal portion with an outer circumferential surface that is roughened.

5. The system for fabricating an optical fiber structure of claim 1, wherein the chip retainer for retaining the block-like chip can hold a block-like chip having a diameter of up to 25 mm.

6. The system for fabricating an optical fiber structure of claim 1, wherein the moving member includes, at a side of the fiber retainer,
   an X-direction movable member configured to move the fiber retainer toward an X direction which is an axis direction of the block-like chip retained by chip retainer and the optical fiber retained by the fiber retainer,
   a Y-direction movable member configured to move the fiber retainer toward a Y direction orthogonal to the X-direction, and
   a Z-direction movable member configured to move the fiber retainer toward a Z-direction orthogonal to the X-direction and orthogonal to the Y-direction, wherein
   the axial relationship observer is formed of an X-direction observation camera, and further includes a Y-direction observation camera configured to observe an axial relationship between the fiber-joined end of the block-like chip and the end of the optical fiber from the Y-direction, and a Z-direction observation camera configured to observe the axial relationship between the fiber-joined end of the block-like chip and the end of the optical fiber from the Z-direction.

7. The system for fabricating an optical fiber structure of claim 6, further comprising a monitor configured to display an image captured by the X-direction observation camera, the Y-direction observation camera, and the Z-direction observation camera.

8. The system for fabricating an optical fiber structure of claim 7, wherein the monitor is configured to display, by dividing a screen, the image captured by each of the X-direction observation camera, the Y-direction observation camera, and the Z-direction observation camera.

9. The system for fabricating an optical fiber structure of claim 6, further comprising a stage body provided at one end with a fiber retainer and provided at the other end with the chip retainer, wherein a length direction of the state body is denoted by the X-direction, a height direction of the state body is denoted by the Y-direction, and a width direction of the state body is denoted by the Z-direction.

10. The system for fabricating an optical fiber structure of claim 9, further comprising a Z-direction magnification observation camera configured to observe the axial relationship between the fiber-joined end of the block-like chip and the end of the optical fiber from the Z-direction.

* * * * *